(12) United States Patent
Thompson et al.

(10) Patent No.: US 6,421,965 B2
(45) Date of Patent: *Jul. 23, 2002

(54) UNITIZED SEISMIC BRACE

(75) Inventors: William J. Thompson, Newport Beach; Keith L. Watkins, Yorba Linda, both of CA (US)

(73) Assignee: Tomarco Contractor Specialties, Inc., Buena Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/791,036

(22) Filed: Feb. 23, 2001

Related U.S. Application Data

(63) Continuation-in-part of application No. 09/496,970, filed on Feb. 2, 2000, now Pat. No. 6,247,274, which is a continuation-in-part of application No. 09/161,968, filed on Sep. 28, 1998, now Pat. No. 6,050,035.

(51) Int. Cl.⁷ ................................................. E04B 1/38
(52) U.S. Cl. ........................... 52/167.1; 52/39; 52/713; 403/71; 403/119; 403/220; 403/260; 248/59; 248/351; 248/638
(58) Field of Search ....................... 52/39, 167.1, 713; 403/71, 119, 209, 220, 243, 260, 262; 248/59, 351, 354.1, 638

(56) References Cited

U.S. PATENT DOCUMENTS

| | | |
|---|---|---|
| 1,132,999 A | 3/1915 | Beers |
| 1,302,727 A | 5/1919 | Thomas |
| 3,353,312 A | 11/1967 | Storch |
| 3,861,104 A | 1/1975 | Bower |
| 4,004,768 A | 1/1977 | Evans et al. |
| 4,065,218 A | 12/1977 | Biggane |
| 4,078,752 A | 3/1978 | Kindorf |
| 4,296,576 A | 10/1981 | Rice, Jr. et al. |
| 4,297,763 A | 11/1981 | Lautenschlager |
| 4,309,019 A | 1/1982 | Bloom |
| 5,145,132 A | 9/1992 | Kirschner |
| 5,188,317 A | 2/1993 | Roth |
| 5,307,752 A | 5/1994 | Perrault et al. |
| 5,412,843 A | 5/1995 | Krongauz et al. |
| 5,435,661 A | 7/1995 | Zmyslowski et al. |
| 5,566,915 A | 10/1996 | Hansare |

Primary Examiner—Carl D. Friedman
Assistant Examiner—Brian E. Glessner
(74) Attorney, Agent, or Firm—Price & Gess

(57) ABSTRACT

A seismic brace for fastening to a support rod at one end and a structural portion of a building, on the other end. The brace is attachable to the support rod without disconnecting it. The brace arm part is bent at an angle of 45° to form a base bracket that connects to the support rod. A locking bracket is hinged to the brace arm to overlay the base bracket. Both the base bracket and locking bracket have a slot extending from an edge towards the middle, the slots are arranged so that they form an aperture when the locking bracket overlays the base bracket part of the brace arm to completely enclose the support rod.

17 Claims, 2 Drawing Sheets

UNITIZED SEISMIC BRACE

CROSS-REFERENCE TO RELATED APPLICATIONS

This application is a continuation-in-part of application Ser. No. 09/496,970, filed on Feb. 2, 2000 for a Unitized Seismic Bracket With Strength Bend, now U.S. Pat. No. 6,247,274 granted Jun. 19, 2001 which is a continuation-in-part of Ser. No. 09/161,968, filed on Sep. 28, 1998 for a Unitized Seismic Bracket, now U.S. Pat. No. 6,050,035 granted Apr. 18, 2000.

BACKGROUND OF THE INVENTION

1. Field of the Invention

Today's commercial buildings use hangers suspended by rods from the underside of the floor above to run pipes, electrical cables, HVAC ducts, communication lines, etc. A seismic brace is used in buildings to prevent adverse sway or movement in the event of an earthquake. Those braces keep the various independent elements of such suspended items within a building intact during an earthquake. Without seismic braces, the independent elements, like pipe hangers, for example, will move independently. This independent movement can result in the pipes suspended in these hangers to break away from their installed positions causing damage or at least inoperable conditions.

2. Description of Prior Art

Various types of seismic braces are in current use, each having multiple parts or requiring various degrees of effort and time to install. For example, U.S. Pat. No. 4,065,218 shows a one piece seismic brace having a first channel iron that connects to a building element hinged to a second channel iron which attaches to the item supported. This brace takes considerable time to install because the fastener of the supported element must be completely undone to attach this brace.

U.S. Pat. No. 5,188,317 shows a brace for a hanger for pipes, electrical cables or the like. The hanger is suspended from a series of rods attached to the overhead floor. This brace uses a separate detached interlock element so that the brace may be attached to the rod without completely removing a hanger from its supporting rod. The interlock element must mate with the rod connecting end in a precise manner to function correctly. Incorrect use of the detached interlock piece, use of an incorrectly sized interlock piece, or simply not using it, will result in insufficient restraint, or the brace coming loose during earthquake induced movement.

None of the prior art seismic braces achieve or fulfill the purpose of the present invention in providing a one piece seismic brace with an integral, built-in interlock structure that does not require disconnecting the hanger from its support rod to attach the brace to the rod.

SUMMARY OF THE INVENTION

The present invention relates to a one piece brace used to brace a hanging support system for utility and service lines to prevent or eliminate the oscillations that develop in such hanging systems when subjected to earthquakes or various types of natural or man-made vibrations. The one piece brace has a brace arm which is bent at a 45° angle to form a base bracket. A locking bracket is hinged to the base bracket at either end. The base bracket part of the brace arm and the locking bracket are slotted. The slots extend from an edge of the bracket. When the locking bracket overlays the base bracket, the slots capture a vertical support rod completely. The one piece brace of the present invention attaches to an already installed system without disassembly of the hangar. Due to the unitized construction of the bracket, ease of assembly, inability to lose a detached piece and correct connection of the brace to the rod, are provided.

BRIEF DESCRIPTION OF THE DRAWINGS

Further aspects of the invention will be apparent when the description and claims set forth below are considered in conjunction with the accompanying drawings, in which like-reference numerals depict like parts throughout the drawings; and wherein:

DESCRIPTION OF THE PREFERRED EMBODIMENTS

The following description is provided to enable any person skilled in the art to make and use the invention and sets forth the best modes, contemplated by the inventor, for carrying out his invention.

This particular invention is intended for use with suspended utility systems, including, but not limited to, individual pipes and conduit, pipe racks and conduit racks, cable trays, bus ducts, HVAC ducts, mechanical equipment, fans and ceiling grids and is specifically intended to provide seismic restraint of these systems.

The complete disclosure of application Ser. No. 09/161,968, filed on Sep. 28, 1998, for a Unitized Seismic Bracket, now U.S. Pat. No. 6,050,035 granted on Apr. 18, 2000 and application Ser. No. 09/496,970 filed on Feb. 2, 2000 for a Unitized Seismic Bracket With Bend, now U.S. Pat. No. 6,247,274 granted Jun. 19, 2001 which is a continuation-in-part of U.S. Pat. No. 6,050,035 are incorporated by reference herein as if fully set forth hereat.

Figure 1:
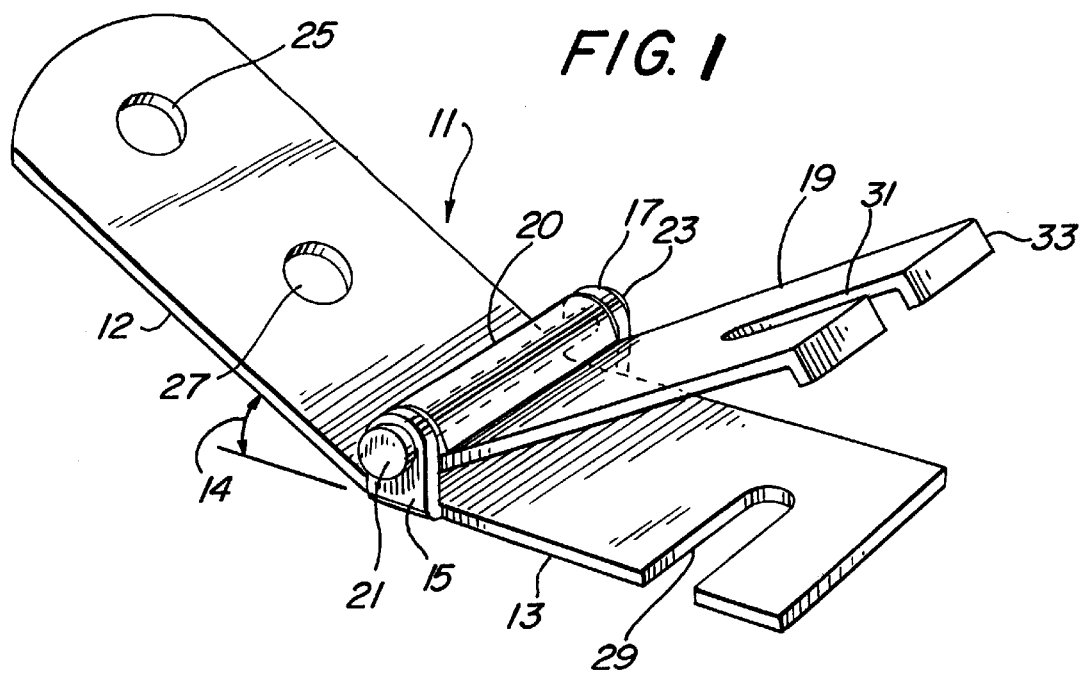
FIG. 1 is a perspective view of a one piece seismic brace of the present invention.
Figure 3:
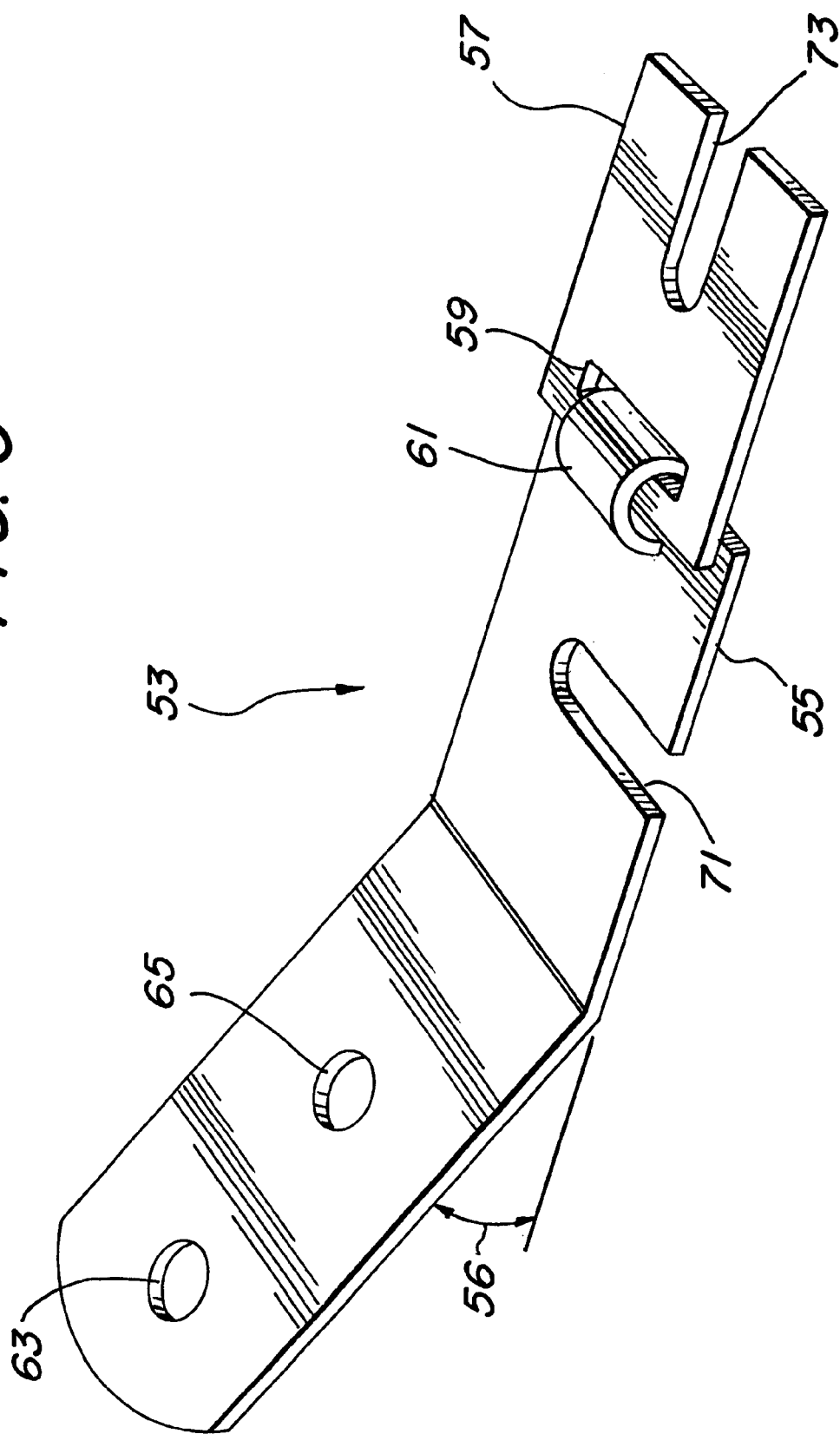
FIG. 3 is a perspective view of yet another alternate embodiment of the one piece seismic brace of the present invention.

FIG. 1 shows a brace 11 according to the present invention which is an improved version of the brace of FIG. 3 shown in application Ser. No. 09/161,968, now U.S. Pat. No. 6,050,035. The improvement is that the brace arm 12 and base bracket 13 are made from one piece of metal. The metal piece is bent at an angle 14 at a point along its length to form the brace arm 12 and the base bracket 13. This bend may vary between 20° to 80° from the horizontal, but is preferably at 45° from the horizontal.

Figure 2:
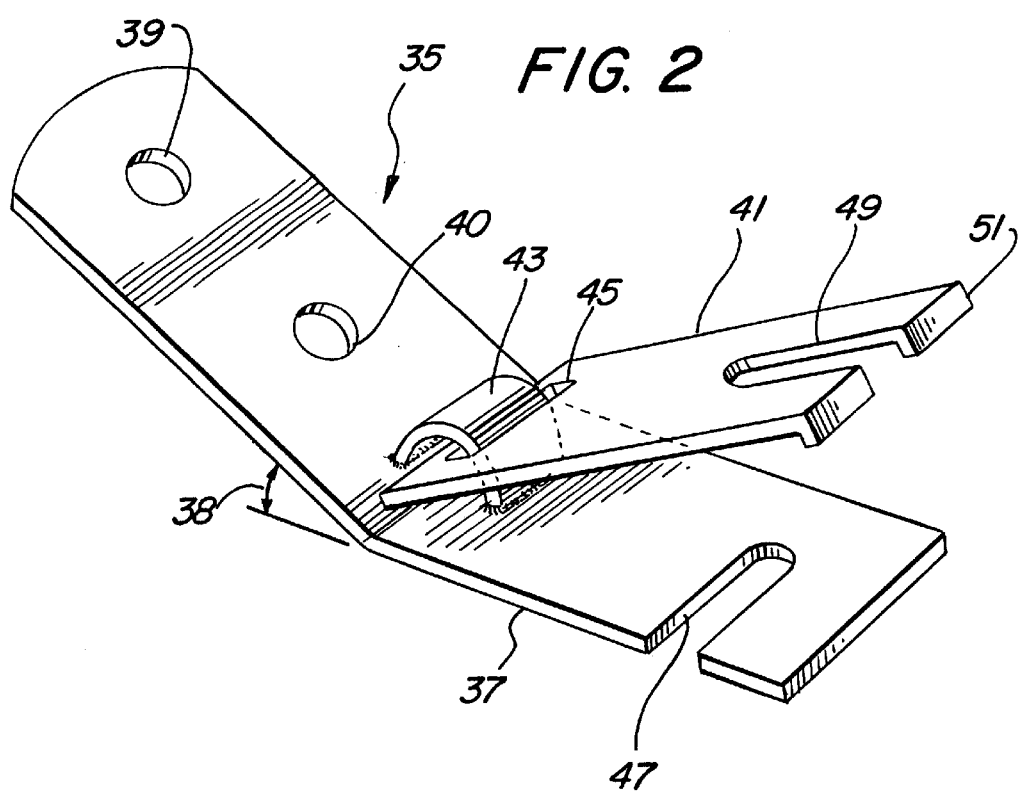
FIG. 2 is a perspective view of an alternate embodiment of the one-piece seismic brace of the present invention.

The brace arm 12 has several or more apertures 25, 27 therein for fastening to a channel 41 or tubular member 49, for example, as shown in FIGS. 2 and 5, respectively of U.S. Pat. No. 6,050,035. The base bracket 13 has a slot 29 therein extending from one edge of the base bracket into its symmetrical center.

A pair of upstanding ears 15 and 17 extend vertically from the surface of base bracket 13, one on each side. Each of these ears has an aperture therethrough which allows passage of a pin, rivet, or nut and bolt arrangement 21, 23, for example, therethrough. The upstanding ears 15, 17, the pin arrangement 21, 23, and a cylinder 20 at the first end of locking bracket 19 act as a hinge allowing locking bracket 19 to swing up to permit installation of brace 11 in the manner shown in FIG. 5 of U.S. Pat. No. 6,050,035. Cylinder 20 is preferably formed by rolling the first end or part of the first end of locking bracket 19. Locking bracket 19 has a slot 31 extending from one edge into its symmetrical center so as to overlap slot 29 in base bracket 13 when locking bracket 19 overlays it. The two slots 29, 31 create a complete enclosure when the locking bracket 19 overlays the base bracket 13. Locking bracket 19 also has a bent end 33 that extends beyond the length of base bracket 13 to facilitate stability of locking bracket 19 when overlaying base bracket 13.

FIG. 2 illustrates an alternate preferred embodiment of a brace according to the present invention. Brace 35, like brace 11 of FIG. 1, has a pair of apertures 39, 40 in its brace arm which is bent at an angle 38 from the base bracket 37. Bend angle 38 may be between 20° to 80°, with 45° being preferred. Base bracket 37 has a slot 47 extending from an edge into its symmetrical center. A locking bracket 41 is hinged to bracket 37 by a loop 43 attached to the brace arm and the base bracket 37 by welding, for example. Loop 43 extends through an aperture 45 in locking bracket 41, which could be a rectangular slot, for example, as shown, to provide hinged movement of locking bracket 41 with respect to the base bracket 37. Locking bracket 41 has a slot 49 extending from an edge into its symmetrical center. A bent end 51 extends beyond the length of base bracket 37.

FIG. 3 illustrates a third preferred embodiment of the unitized brace of the present invention. Like the braces of FIGS. 1 and 2, brace 53 has a couple of apertures 65, 63 in its brace arm which is bent at an angle 56 from the base bracket 55. Bend angle 56 may be between 20° to 80° from the horizontal with 45° being preferred. Base bracket 55 has a slot 71 extending from an edge into its symmetrical center. The locking bracket 57 is attached to the end of the base bracket 55 by a hinge arrangement made out of a loop 61, that is part of the base bracket 55, which passes through an aperture 59, in locking bracket 57, which could be a rectangular slot. This hinge arrangement allows the locking bracket 57 to pivot in and out of overlaying engagement with base bracket 55. When locking bracket 57 overlays base bracket 55, the slot 73 in locking bracket 57 and the slot 71 in the base bracket 55 create a completely enclosed aperture for capturing a support rod.

Having illustrated and described the preferred embodiments as well as variants of this invention, it will be obvious to those skilled in the art that further changes and modifications may become apparent. Such changes and modifications are not to affect the inventive concept and are to be considered within the scope of this invention.

What is claimed is:

1. A brace to prevent sway between a support and a structure during movement of the structure and support from seismic activity, the brace comprising:

a brace arm having a first and second end, wherein the first end is adapted to extend from the support, and the second end is adapted to connect the brace arm to an element which is connected to the structure, the brace arm being bent perpendicular to its length between its first and second end, the part of the brace arm at its first end forming a base bracket having an opening extending from an edge thereof towards a center of the base bracket; and a locking bracket, having a first and second end, the first end being flexibly attached to the brace arm, said locking bracket having an opening extending from an edge thereof towards a center of the locking bracket;

whereby when the locking bracket overlays the base bracket, the locking bracket and the base bracket form an opening which is adapted to completely enclose the support.

2. The brace of claim 1 wherein the opening in the base bracket is a slot having a width adapted to be slightly larger than the diameter of the support, and wherein the opening in the locking bracket is a slot having a width adapted to be slightly larger than the diameter of the support.

3. The brace of claim 1 wherein the brace arm is bent at an angle of 45° from the base bracket.

4. The brace of claim 1 wherein the locking bracket is flexibly attached to the brace arm by a hinge.

5. The brace of claim 4 wherein the hinge comprises:

a pair of upstanding ears having apertures therethrough attached to the brace arm;

a cylinder at the first end of the locking bracket; and a pin passing through the upstanding ears and the cylinder in the locking bracket.

6. The brace of claim 5 wherein the pin is a nut and bolt.

7. The brace of claim 5 wherein the pin is a rivet.

8. The brace of claim 1 wherein the locking bracket is flexibly attached to the brace arm by a metal ring attached to the brace arm and passing through an aperture in the first end of the locking bracket.

9. The brace of claim 1 wherein the opening in the base bracket is a slot having a width adapted to be slightly larger than the diameter of the support and wherein the opening in the locking bracket is a slot having a width adapted to be slightly larger than the diameter of the support, and wherein the main axis of the base bracket slot is different from the main axis of the locking bracket slot.

10. The brace of claim 9 wherein the main axis of the base bracket slot is at ninety degrees to the main axis of the locking bracket slot.

11. A brace to prevent sway between a support and a structure during movement of the structure and support from seismic activity, the brace comprising:

a brace arm, having a first and second end, wherein the first end is adapted to extend from the support, and the second end is adapted to connect the brace arm to an element which is connected to the structure, the brace arm being bent perpendicular to its length between the first and second end, the part of the brace arm at its first end forming a base bracket having an opening extending from an edge thereof towards a center of the base bracket; and a locking bracket, having a first and second end, the first end being flexibly attached to the first end of the brace arm, said locking bracket having an opening extending from an edge towards a center of the locking bracket;

whereby when the locking bracket overlays the base bracket, the opening of the locking bracket and the opening of the base bracket form an opening which is adapted to completely enclose the support.

12. The brace of claim 11 wherein the opening in the base bracket is a slot having a width adapted to be slightly larger than the diameter of the support, and wherein the opening in said locking bracket is a slot having a width adapted to be slightly larger than the diameter of the support.

13. The brace of claim 11 wherein the brace arm is bent at an angle of 45° from the base bracket.

14. The brace of claim 11 wherein the locking bracket is flexibly attached to the base bracket by a hinge.

15. The brace of claim 14 wherein the hinge comprises a metal ring attached to the brace arm and passing through an aperture in the locking bracket.

16. The brace of claim 11 wherein the opening in the base bracket is a slot having a width adapted to be slightly larger than the diameter of the support, and wherein the opening in said locking bracket is a slot having a width adapted to be slightly larger than the diameter of the support, and wherein the main axis of the base bracket slot is different from the main axis of the locking bracket slot.

17. The brace of claim 16 wherein the main axis of the base bracket slot is at ninety degrees to the main axis of the locking bracket slot.

* * * * *